May 21, 1968     F. WINKLER ETAL     3,384,437

MOTION PICTURE CAMERA

Filed May 5, 1965     2 Sheets-Sheet 1

INVENTOR.
FRIEDRICH WINKLER
KARL NEUDECKER

BY Michael J. Striker
Atty

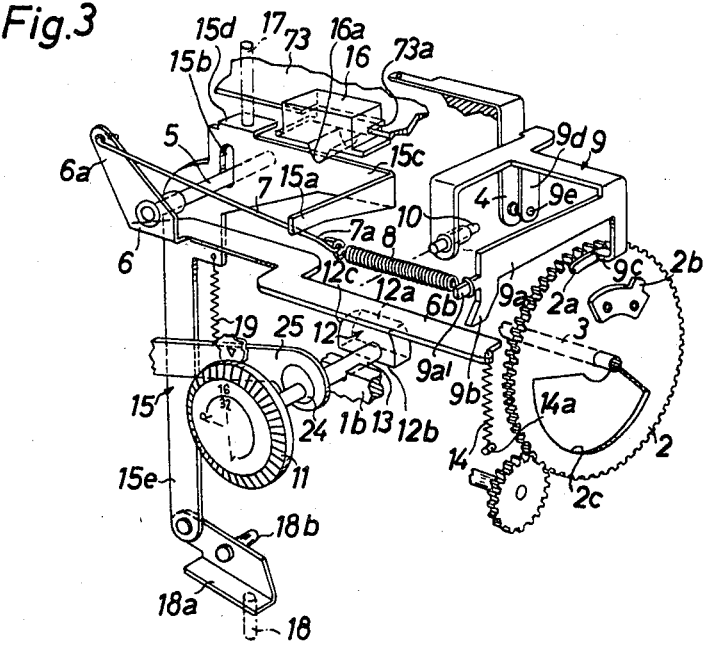
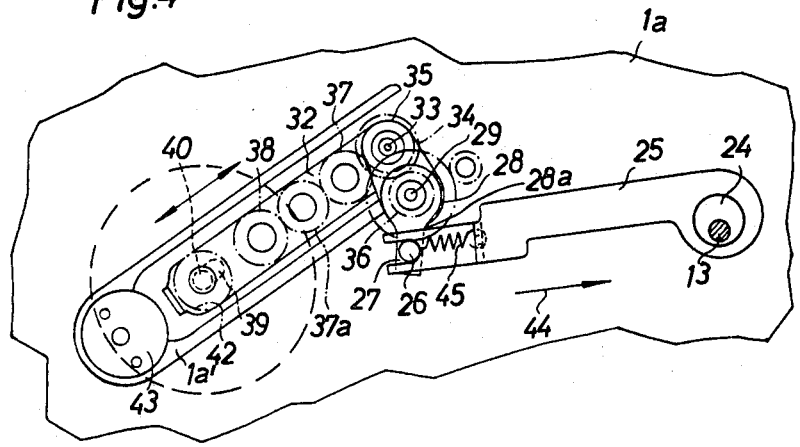

United States Patent Office 3,384,437
Patented May 21, 1968

3,384,437
MOTION PICTURE CAMERA
Friedrich Winkler and Karl Neudecker, Munich, Germany, assignors to Agfa Aktiengesellschaft, Leverkusen, Germany
Filed May 5, 1965, Ser. No. 453,407
Claims priority, application Germany, June 30, 1964, A 46,454
23 Claims. (Cl. 352—124)

ABSTRACT OF THE DISCLOSURE

A motion picture camera wherein the devices which control the starter for the motor, the backwind mechanism and the pulldown are mounted on a single manually operable selector. The pulldown is inoperative when the backwind mechanism is ready to rewind the film and vice versa.

---

The present invention relates to motion picture cameras in general, and more particularly to an improved selector unit which controls the operation of certain mechanisms and devices forming part of a motion picture camera. Still more particularly, the invention relates to a selector unit adapted to control the starter structure for a motor which drives the shutter mechanism and operates the pull-down, to control the pull-down, and to control the backwind mechanism of a motion picture camera.

It is already known to provide a motion picture camera with two selectors the first of which disengages the pull-down from the film when the backwind mechanism is in a position ready to transport the film from the take-up back to the supply spool. The first selector is movable axially between two positions and, when moved to one of such positions, can be rotated by hand to operate the backwind mechanism. The second selector sets the shutter mechanism for single-frame release or for multiple-frame release. Thus, in order to properly adjust the camera, the operator must manipulate two selectors. Another serious drawback of such cameras is that the first selector which controls the pull-down and the backwind mechanism is likely to be accidentally shifted to a position in which the film can be wound back to the supply spool. As a rule, the first selector is depressed when the backwind mechanism is ready to transport the film and an inexperienced operator is quite likely to depress the first selector when he is about to remove the film cartridge from the camera housing. Also, when the first selector is depressed, it is more difficult to grasp in order to operate the backwind mechanism.

Accordingly, it is an important object of our present invention to provide a very simple, inexpensive, easy-to-install, readily accessible, compact and easy-to-handle selector unit which can be actuated by hand to control more than two functions of a motion picture camera and to construct the selector unit in such a way that any given function which would interfere with one or more other functions of a motion picture camera cannot be carried out when the mechanism or mechanisms utilized to carry out such other functions are moved to operative positions.

Another object of the invention is to provide a selector unit which can control not only the pull-down and backwind mechanism but also the mechanism or mechanisms which will set the shutter mechanism of a motion picture camera for single-frame release, for multiple-frame (intermittent) release, or for no-release.

A further object of the invention is to provide a selector unit of the above outlined characteristics which need not carry out more than one type of movement in order to prepare the various mechanisms for performing their respective functions.

An additional object of the invention is to provide novel connections between the improved selector unit and the pull-down, backwind and starter mechanisms of a motion picture camera.

Still another object of the invention is to provide a selector unit which automatically prevents the motor from driving the shutter mechanism and/or from operating the pull-down when the backwind mechanism is ready to transport the film from the take-up to the supply pool.

A concomitant object of the invention is to provide a motion picture camera which embodies the improved selector unit and to construct the selector unit in such a way that its component parts occupy a minimum of space.

A further object of the invention is to provide a motion picture camera wherein the selector unit which controls various mechanisms in the housing of the camera comprises a single actuating member and wherein the operative connection between the selector unit and the backwind mechanism is such that the latter is capable of operating a film frame counter or footage indicator.

It is also an object of the present invention to provide a motion picture camera wherein the backwind mechanism is constructed and assembled in such a way that it will actually transport the film from the take-up and back to the supply spool only when the selector unit is set for such operation, i.e., when the pull-down is disengaged from the film so that, even though a careless operator decides to operate the backwind mechanism while the pull-down engages the film, such operation of the backwind mechanism will not result in any advance of the film.

Another object of the invention is to provide a motion picture camera wherein the backwind mechanism can be operated by manually actuatable means other than the selector unit and wherein such manually actuatable means for the backwind mechanism will be in a position to effect the advance of the film only at a time when the selector unit is intentionally placed into a position in which the operation of the backwind mechanism will not result in damage to or in destruction of the film. Thus, it is much less likely that a careless operator would wind the film back at an inopportune time, namely, when the film is engaged by the claw or claws of the pull-down, because the transport of film back to the supply spool requires two operations including choosing the corresponding position of the selector unit and operating the backwind mechanism by manually actuatable means other than such selector unit.

Briefly stated, one feature of our invention resides in the provision of a motion picture camera which comprises a shutter mechanism, a supply spool or a similar source of film, take-up means for receiving the film from the supply spool, a pull-down movable between operative and idle positions into and out of engagement with the film, motor means for driving the shutter mechanism and for operating the pull-down in the operative position thereof, starter means for the motor means, backwind means movable between idle and operative positions and adapted to move the film from the take-up means back to the source in the operative position thereof, and manually actuated selector means comprising three cam means for controlling the operations which may be performed respectively by the starter means, pull-down and backwind means. The cam means are constructed and mounted in such a way that the pull-down is maintained in idle position when the backwind means is operative or vice versa so that the film cannot be withdrawn from the source when the backwind means is in a position in which the operator can wind the film from the take-up and back to the source.

In its preferred form, the selector means comprises a rotary cam shaft which carries a plurality of cams or a composite cam which can perform the function of at least three individual cams. The cam which controls the starter means for the motor will prevent the motor from running when the backwind means is in a position ready to be manipulated or actuated by hand for transporting the film back to the source, and vice versa.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of a specific embodiment with reference to the accompanying drawings, in which:

FIG. 3 is a perspective view of certain mechanisms in and on the housing; and

FIG. 4 is an enlarged side elevational view of a portion of the structure shown in FIG. 2, as seen in the direction of the arrow IV.

Figure 1:
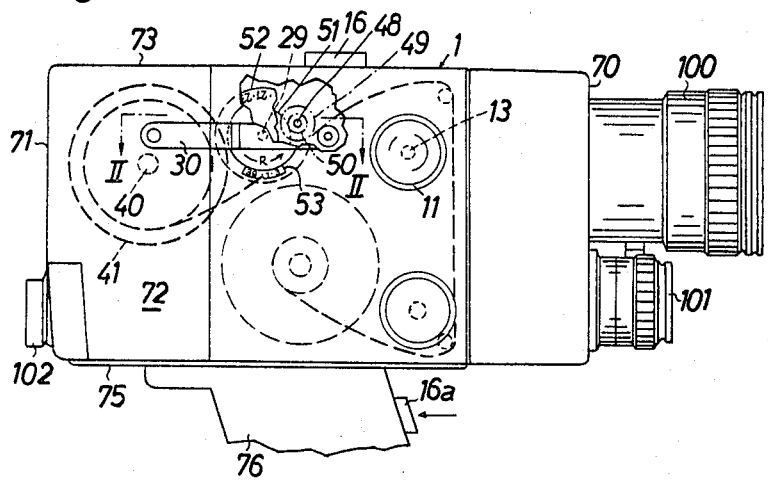
FIG. 1 is a side elevational view of a motion picture camera which embodies our invention, one side wall of the camera housing being partly broken away.

Referring first to FIG. 1, there is shown a moving picture camera which comprises a housing 1 having a front wall 70 which carries a lens mount 100 and a viewfinder 101. The rear wall 71 of the housing carries an eyepiece 102, and one side wall 72 of the housing carries a manually actuatable control knob or selector knob 11, a manually actuatable backwind knob 31 and a manually actuatable backwind lever 30, the parts 30, 31, 72 being best shown in FIG. 2. The top wall 73 of the housing accommodates a first depressible release trigger 16 and the other side wall 74 of the housing may be hinged or is fully removable so as to afford access to the cassette for a supply spool 41 (FIG. 2) and to allow for threading of a fresh film 47 so that a portion of the film is guided behind the lens mount 100. The bottom wall 75 of the housing carries a pistol grip 76 with a second depressible release trigger 16a.

FIG. 3 illustrates the manner in which the manually actuatable selector knob 11 enables the camera to perform various functions. A rotary shutter mechanism 2 has an aperture 2c through which light coming from a viewed scene or object may reach that frame of the film 47 which is momentarily located behind the film gate, not shown. The shaft 3 of the shutter mechanism 2 is the output shaft of, or is indirectly driven by, a suitable electric motor or spring motor. In the present instance, the shaft 3 forms part of a drive including an electric motor E (see FIG. 2) whose switch is shown at 4. A transversely extending horizontal shaft 5 is mounted in the side wall 72 and in a vertically extending internal partition or portion 1a of the housing 1. This shaft 5 supports a rockable two-armed control lever 6. The free end of the shorter arm 6a of the lever 6 is connected with the rear end of a release rod 7 and the front end portion 7a of this rod is bent over itself so that it remains coupled to the rear end of a helical contraction spring 8. The front end of the spring 8 is coupled to a laterally extending lug 9a' forming part of a downwardly extending front flange 9a of an inverted U-shaped tiltable starter lever or actuating lever 9. The front flange 9a also comprises two downwardly extending fingers 9b, 9c. The starter lever 9 is tiltable about the axis of a transverse horizontal shaft 10 which is mounted in the side wall 72 and in the partition 1a in a manner not specifically shown in the drawings. The axis about which the starter lever 9 can be tilted is parallel with the axis of the shaft 5. The rear flange 9d of the starter lever 9 carries the movable contact 9e of the motor switch 4.

The selector knob 11 is rigidly secured to a cam shaft 13 which is journalled in a bearing member 1b forming part of or secured to the housing 1, and the axis of the cam shaft 13 is parallel with the axis of the shafts 5 and 10. It will be seen that the outer end of the cam shaft 13 extends through the side wall 72 so that the selector knob 11 is located externally of the housing 1 and may be readily manipulated by two fingers. A median portion of the cam shaft 13 carries a composite cam 12 which includes a first flat cam face 12a, a second flat cam face 12b preferably parallel to the cam face 12a, and a third cam face 12c whose plane is substantially normal to the cam faces 12a, 12b. As shown in FIG. 3, the cam faces 12a, 12b are actually parallel to each other but the distance between the axis of the cam shaft 13 and cam face 12a exceeds the distance between the axis of the cam shaft 13 and the cam face 12b.

When the motion picture camera is not in use, the longer arm 6b of the control lever 6 bears against the cam face 12a, 12b or 12c of the composite cam 12. The arm 6b is biased into such position by the spring 8 which pulls the release rod 7 forwardly so that the shorter arm 6a of the control lever 6 tends to rotate in a clockwise direction, as the parts appear in FIG. 3. The spring 8 may be assisted by a relatively weak auxiliary spring 14 which constitutes an optional feature of the camera and is shown connected to the foremost end of the longer arm 6b. The lower end of the spring 14 is coupled to a post 14a which is rigid with the housing 1.

In FIG. 3, the underside of the longer arm 6b abuts against the cam face 12a; therefore, the control lever 6 is maintained in an intermediate position substantially midway between a first end position (when the longer arm 6b abuts against the cam face 12b and is permitted to move nearer to the cam shaft 13), and a second end position (when the cam face 12c lifts the longer arm 6b to a level at a maximum distance from the cam shaft 13). The front end portion of the longer arm 6b serves as an abutment for the finger 9b of the starter lever 9, and this lever 9 is biased by the spring 8 in a sense to rotate in a counterclockwise direction, as viewed in FIG. 3, so that the contact 9e remains spaced from the fixed contact of the motor switch 4 and that the finger 9b rises to an upper end position which is actually shown in FIG. 3. Depending on the angular position of the longer arm 6b, the finger 9b will be compelled to remain in such upper end position (when the longer arm 6b is engaged by the cam face 12c), the finger 9b will be capable of descending to a central or neutral position (when the arm 6b is engaged by the cam face 12a), and the finger 9b may move to a lower end position (when the longer arm 6b is engaged by the cam face 12b). In FIG. 3, the position of the longer arm 6b is determined by the cam face 12a and, therefore, the finger 9b can descend to its central or neutral position if the starter lever 9 is caused to rock in a clockwise direction.

The trigger 16 extends through a suitable aperture 73a in the top wall 73 of the housing 1 but is normally held in an upper end position because it is under the bias of the spring 8 through the intermediary of the release rod 7 and a release lever 15 which latter comprises a laterally extending leg 15a resting on the front portion of the release rod 7. The underside of the trigger 16 carries a knife edge 16a which abuts against a horizontal arm 15c of the release lever 15. The leg 15a is provided at the front end of the arm 15c. The release lever 15 is formed with an elongated vertical slot 15b which receives the shaft 5 so that this lever is free to move up and down, within limits determined by the length of the slot 15b. The length of this slot is selected in such a way that the starter lever 9 is tilted in a clockwise direction (about the axis of the shaft 10) when the trigger 16 is depressed by a finger so that the shaft 5 is accommodated in the upper portion of the vertical slot 15b. The arm 15c carries a small platform 15d which may be depressed by a third release trigger 17 forming part of a cable release connection of any known design. The trigger 17 is also biased to its upper end position because the release lever 15 is under the bias of the spring 8. A downwardly extending second arm 15e of the release lever 15 is articulately coupled to one end of a small link 18a which is fulcrumed at 18b and may be pivoted in a counter-clockwise direction, as viewed in FIG. 3, in response to depression of the trigger 16a on the pistol grip 76 (FIG. 1). The means for pivoting the link 18a in response to depression of the trigger 16a comprises a pin 18 which moves upwardly when the trigger 16a is depressed whereby the link 18a pivots in a counterclockwise direction and pulls the arm 15e downwardly so that the slot 15b also moves downwardly and the leg 15a depresses the release rod 7.

In response to actuation of one of the triggers 16, 16a, 17, the leg 15a pushes the front end portion of the release rod 7 downwardly whereby the spring 8 causes the starter lever 9 to pivot in a clockwise direction until the finger 9b reaches the upper side of the longer arm 6b. If the arm 6b abuts against the cam face 12a, it can descend to a central or neutral position so that the rearwardly bent tip of the finger 9c takes a first position at a certain distance from the axis of the shaft 3, namely, at a distance which is selected in such a way that the shutter mechanism 2 is then free to rotate as soon as the motor switch 4 closes (multiple-frame release). The front face of the shutter mechanism 2 carries two projections 2a, 2b which are disposed at different radial distances from the shaft 3 and each of which may be engaged by the finger 9c in response to movement of the finger 9b into the corresponding end position. When the finger 9b remains in its upper end position (FIG. 3), the tip of the finger 9c extends into the path of the outer projection 2a; however, if the longer arm 6b abuts against the cam face 12b, the finger 9b may descend into the path of the projection 2b and then permits the shutter mechanism 2 to complete a single revolution (single-frame release). When the longer arm 6b is held in the position of FIG. 3 and the finger 9b descends to its central position, the tip of the finger 9c is located midway between the projections 2a, 2b so that the shutter mechanism 2 may rotate as long as the motor 4 continues to drive the shaft 3 (multiple frame release). When the finger 9c takes the position of FIG. 3, the shutter mechanism 2 is arrested in a fully automatic way and remains set in the no-release position because the outer projection 2a abuts against the tip of the finger 9c. The arrangement is such that the rear flange 9d of the starter lever 9 automatically closes the motor switch 4 as soon as the finger 9b is caused to move to its central or lower end position respectively determined by the cam face 12a or 12b. In other words, the motor E will be running whenever the finger 9b is caused to descend below the position shown in FIG. 3, this illustration showing the longer arm 6b of the control lever 6 in a position in which the shutter mechanism 2 is set for intermittent exposure (multiple frame release). Whenever the operator depresses the trigger 16, 16a or 17, the leg 15a causes the finger 9b to abut against the longer arm 6b, the motor E begins to run, and the tip of the finger 9c moves to its neutral position in which the shutter mechanism 2 is free to rotate, for example, at a speed of 16 frames per second. As soon as the trigger 16, 16a or 17 is released, the spring 8 automatically returns the finger 9b to its upper end position, the lever 9 opens the motor switch 4, and the finger 9c returns into the path of the outer projection 2a so that the shutter mechanism 2 is arrested in the position of FIG. 3.

If the operator decides to turn the selector knob 11 through an angle of 180 degrees, the cam face 12b will face upwardly and will arrest the longer arm 6b in the latter's lower end position. If the operator then decides to depress the trigger 16, 16a or 17, the motor E begins to run because the switch 4 is closed by the flange 9d, and the finger 9c descends below the level of the outer projection 2a so that the shutter mechanism 2 begins to rotate. However, the free end of the longer arm 6b is then in a position in which it allows the finger 9b to reach its lower end position whereby the finger 9c moves into the path of the inner projection 2b and arrests the shutter mechanism 2 after a single revolution. In such condition of adjustment of the levers 6 and 9, the shutter mechanism 2 is set for single-frame release. In order to expose the next frame, the user must first release the respective trigger and then again depress the same trigger or another trigger in order that the finger 9c may return into abutment with the outer projection 2a prior to descending while the motor E runs so that the shutter mechanism 2 performs a second single revolution. As a rule, the operative connection between the shaft 3 and the motor E will comprise a friction clutch or the like which allows the motor to run even though the shaft 3 is held against rotation because the finger 9c engages the inner projection 2b.

If the operator decides to turn the selector knob 11 through an angle of 90 degrees (in a clockwise direction, as viewed in FIG. 3), the cam face 12c engages the underside of the longer arm 6b and keeps this longer arm in abutment with the finger 9b. Thus, the control lever 6 then prevents the user from making an exposure because the starter lever 9 cannot be tilted and the tip of the finger 9c remains in the path of the outer projection 2b. The shutter mechanism is then set for no-release and the backwind mechanism of the camera is set for winding the film back onto the supply spool 41. It will be seen that the motor switch 4 cannot be closed when the longer arm 6b of the control lever 6 is engaged by the cam face 12c, this cam face being located at a greater distance from the cam shaft 13 than the face 12a or 12b.

The cam shaft 13 further carries a second cam 20 (see FIG. 2) which is provided on the inner end portion of the cam shaft and whose cam face is inclined with reference to the axis of this shaft. The face of the cam 20 is not symmetric with reference to the axial direction of the cam shaft 13, and this cam 20 serves to move the claw lever 23 of a pull-down to an idle or inoperative position in which the claw 23b remains disengaged from the film 47. The claw lever 23 is rockable about the axis of a vertical shaft 22 which is fixed to the housing 1. A spring 21 or an analogous resilient element tends to rock the claw lever 23 in a counterclockwise direction, as viewed in FIG. 2 so that the claw 23b tends to enter the perforations of the film 47. The claw lever 23 is operated by the motor E which drives the shaft 3 in a well known manner and, therefore, the operative condition between the motor E and the lever 23 is not shown in the drawings. The claw 23b is located at the free end of one arm of the claw lever 23 and the free end of the other arm of the lever 23 carries a follower 23a which abuts against the face of the cam 20 because it is biased by the spring 21. When the selector knob 11 is held in such angular position that the longer arm 6b of the control lever 6 is engaged by the cam face 12a or 12b, the face of the cam 20 allows the claw lever 23 to return to operative position and to perform movements which are ncessary to transport the film 47 in the required way. However, when the cam shaft 13 of the selector unit is turned in a sense to move the cam face 12c into engagement with the longer arm 6b of the control lever 6, the face of the cam 20 automatically rocks the claw lever 23 in a sense to disengage the claw 23b from the film 47 whereby the film is ready to be wound back onto the supply spool 41. The follower 23a then engages the highest point of the cam 20. As soon as the user decides to turn the selector knob 11 in a sense to move the cam face 12a or 12b into abutment with the longer arm 6b, the cam 20 automatically releases the claw lever 23 so that this lever is again in an operative position in which it can be driven by the motor E in order to advance the film 47 in stepwise fashion, i.e., the claw 23b is then movable to the left, as viewed in FIG. 2, so that it can enter the perforations of the film.

Figure 2:
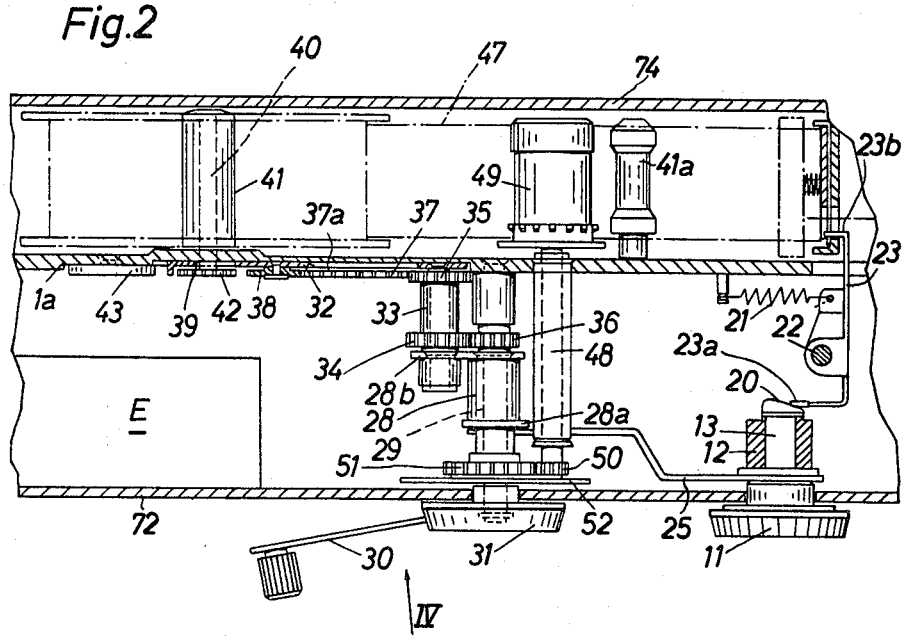
FIG. 2 is an enlarged fragmentary horizontal section as seen in the direction of arrows from the line II—II of FIG. 1.

The cam shaft 13 further carries a third cam 24, shown in the form of an eccentric disk which serves to shift a push rod or strap 25 of the backwind mechanism, see particularly FIG. 4. The disk 24 is rotatably received in a complementary opening at the forward end of the strap 25, and the rear end of this strap is detachably coupled to a motion transmitting sleeve 28 which is rotatably mounted on a transverse horizontal shaft 29. The mounting of the shaft 29 is shown in FIG. 2. The coupling between the strap 25 and motion transmitting sleeve 28 comprises a pin and slot connection, the slot 27 being formed in the strap 25 and the pin 26 being carried by a radially extending arm 28a provided at the outer end of the sleeve 28. A spring 45 or an analogous resilient element operates between the arm 28a and strap 25 to keep the pin 26 in the slot 27. FIG. 4 shows that the slot 27 is open so that the pin 26 may be disengaged from the strap 25. The inner end of the motion transmitting sleeve 28 is rigid with a second arm 28b which is articulately coupled with the front end of an elongated slide 32 by a stub shaft 33. The shaft 29 is the backwind shaft of the camera and carries the aforementioned manually actuatable backwind knob 31 and backwind lever 30, the parts 30, 31 being located at the outer side of the wall 72.

The stub shaft 33 is rigid with two gears 34 and 35 which form part of a gear train serving to rotate the supply spool 41 in response to rotation of the knob 31 or lever 30. This gear train further comprises a gear 36 which is fixedly mounted on the backwind shaft 29 and meshes with the gear 34, a pair of meshing intermediate gears 37, 37a which are rotatably mounted on the slide 32 and the first of which meshes with the gear 35, and a third intermediates gear 38 which is also mounted on the slide 32 and meshes with the gear 37a. The gear 38 can rotate a driven gear 42 which is coaxially secured to the shaft 40 of the supply spool 41. The slide 32 has an elongated slot 39 which receives the shaft 40, i.e., the slide is movable forwardly and rearwardly to place the third intermediate gear 38 into or out of mesh with the driven gear 42. The slide 32 is reciprocably mounted on suitable guide means 1a' provided on the partition 1a and may move into or out of abutment with an angularly adjustable eccentric stop 43. When the rear end of the slide 32 abuts against the stop 43, the gears 38, 42 mesh with each other and the shaft 40 may be rotated by hand via knob 31 or lever 30 in order to wind the film 47 in a direction from the take-up spool 41a and back onto the supply spool 41.

If the selector knob 11 is moved to such angular position that the free end of the longer arm 6b of the control lever 6 abuts against the cam face 12c of the cam 12, the cam 20 causes the claw 23b to move away from the film 47 and the cam disk 24 causes the strap 25 to move forwardly (see the arrow 44 in FIG. 4) so that the motion transmitting sleeve 28 is rotated in a counter-clockwise direction and causes the slide 32 to move with reference to the guide means 1a' and into abutment with the eccentric stop 43. The intermediate gear 38 is now in mesh with the driven gear 42 and, by rotating the knob 31 or the lever 30, the user automatically causes the shaft 40 to rotate in a sense to wind the film 47 from the take-up spool 41a back onto the supply spool 41. At the same time, the cam face 12c prevents the finger 9c from leaving the position shown in FIG. 3 so that the motor switch 4 remains open and the outer projection 2a of the shutter mechanism 2 remains in abutment with the tip of the finger 9c, i.e., the shutter mechanism is set for no-release. In other words, the backwinding operation can take place only when the motor E is idle and when the claw 23b is disengaged from the film 47. The knob 31 or the lever 30 rotates the backwind shaft 29 which drives the gear 36, and this gear 36 drives the gear 42 through the gears 34, 35, 37, 37a and 38. The means for rocking the motion transmitting sleeve 28 about the axis of the shaft 29 is actually constituted by the resilient element 45 which causes the pin 26 to remain in the slot 27. Thus, the resilient element 45 prevents jamming of the gear train by preventing excessive pressure between the gears 38 and 42 provided that the slide 32 cannot reach the eccentric stop 43 when the longer arm 6b of the control lever 6 is engaged by the cam face 12c. The film 47 is indicated diagrammatically by broken lines, see FIG. 2.

As soon as the selector knob 11 is moved to an angular position in which the longer arm 6b of the control lever 6 is engaged by the cam face 12a or 12b, the eccentric cam 24 causes the strap 25 to move rearwardly, as viewed in FIG. 4, whereby the pin 26 compels the motion transmitting sleeve 28 to rotate in a clockwise direction so that the stub shaft 33 pulls the slide 32 in the guide means 1a' and away from the stop 43 so that the gear 38 is automatically disengaged from the driven gear 42. It will be seen that the backwind mechanism is moved to an idle position whenever the longer arm 6b assumes a position in which it allows the starter lever 9 to close the motor switch 4. Also, the selector knob 11 automatically returns the claw lever 23 to operative position whenever the longer arm 6b is engaged by the cam face 12a or 12b. If the operator fails to note that the selector knob 11 is in a position in which the motor switch 4 can be closed in response to depression of one of the triggers 16, 16a, 17 and decides to rotate the knob 31 or lever 30, the backwind mechanism will rotate but cannot drive the gear 42 so that the film 47 cannot be wound back onto the supply spool 41.

Since the backwind shaft 29 can be rotated at any time, namely, regardless of whether or not the gear 38 meshes with the gear 42, even a very careless or inexperienced operator cannot damage the film because, in order to rotate the shaft 40 of the supply spool 41, the user must rotate the lever 30 or the knob 31 at a time when the selector knob 11 is intentionally moved into an angular position in which the control lever 6 is engaged by the cam face 12c, i.e., in which the cam 12 effects blocking of the shutter mechanism 2 in the no-release setting. We intentionally provide separate manually actuatable means (knob 31 or lever 30) for operating the backwind mechanism to make sure that, even if the selector knob 11 is accidentally moved into an angular position in which the gear 38 meshes with the driven gear 42, the user must rotate a part (the knob 31 or the lever 30) other than the selector knob 11 in order to actually transport the film 47 back to the supply spool 41.

The camera of our invention also comprises a film frame counter or footage indicator which is driven by the sprocket 49 of the film transport. This film frame counter is driven when the film 47 advances in response to operation of the claw lever 23 as well as when the motor E is idle and the user operates the backwind mechanism via lever 30 or knob 31. The sprocket 49 is mounted on a transverse horizontal shaft 48 which is journalled in the partition 1a and carries a pinion 50 meshing with a gear 51 rotatably mounted on the backwind shaft 29. The gear 51 is rigid with a disk-shaped scale 52 which is graduated to indicate the number of that film frame which is momentarily located in front of the film gate. A portion of the graduated side of the scale 52 is observable through a window 53 provided in the side wall 72, see FIG. 1. The side wall 72 also carries a marker (not shown) which serves to pinpoint that numeral or graduation on the scale 52 which is indicative of the film frame located in front of the film gate.

When the sprocket 49 is driven by the motor E to transport the film 47 from the supply spool 41 onto the takeup spool 41a, the shaft 48 is rotated in a first direction to drive the scale 52 via pinion 50 and gear 51. If the selector knob 11 is adjusted to allow for winding of film 47 back onto the supply spool 41, the scale 52 is again driven by the shaft 48 but in the opposite direction. It was found that the reading of the scale 52 is particularly easy if this scale is mounted behind the side wall 72 so that it is coaxial with the backwind shaft 29. However, it is clear that this scale can be mounted in another part of the motion picture camera; in such instances, the film frame counter will include one or more intermediate gears which transmit motion between the gear 51 and pinion 50.

It is also clear that the gear reducer constituted by the gear 50 and pinion 51 may be replaced by a gear reducer with three or more gears. Furthermore, the cams 12 and 20 or 12, 20 and 24 could be combined into a unitary cam structure with a total of four or five cam faces respectively corresponding to the faces 12a–12c, to the inclined face of the cam 20 and to the peripheral face of the cam 24. Such unitary cam structure could consist of a single disk mounted on the cam shaft 13 and having a requisite number or lobes each of which replaces a cam face. Also, the means for closing or opening the motor switch 4 and for controlling the rotation of the shutter mechanism 2 could be constructed and assembled in a number of ways because, in one of its important aspects, our invention is concerned with such construction of the selector unit 11, 12, 13, 20, 24 that the shutter mechanism 2 cannot rotate when the camera is set for backwind, that the pull-down is automatically disengaged from the film 47 when the operator decides to wind the film back onto the supply spool 41, and that the backwind is automatically disconnected from the supply spool 41 when the camera is ready to expose one or more frames.

It is further to be noted that the cam 12 could be used to control the position of a further lever (not shown) which would automatically enter a notch or recess in a starter shaft or release shaft when the camera is set for backwind so that the motor E could not be started during winding of film 47 back onto the supply spool 41.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof; and single manually actuated selector means comprising first cam means for controlling said actuating means, second cam means for controlling said pull-down, and third cam means for controlling said backwind means, said second and third cam means being respectively arranged to maintain said pull-down in operative and idle positions when said backwind means is respectively maintained in the idle and operative positions thereof, said actuating means being arranged to arrest said motor means in the operative position of said backwind means.

2. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof; and manually actuated selector means comprising a rotary cam shaft, first cam means provided on said shaft for controlling said actuating means, second cam means provided on said shaft for controlling said pull-down, and third cam means provided on said shaft for controlling said backwind means, said second cam means being arranged to maintain said pull-down in operative and idle positions when said third cam means respectively maintains said backwind means in idle and operative positions, said actuating means being arranged to arrest said motor means in the operative position of said backwind means.

3. In a motion picture camera, in combination, a rotary shutter mechanism; a source of film supply and film take-up means; a pull-down movable between operative and idle positions into and out of engagement with the film; motor means for driving said shutter mechanism and for operating said pull-down; actuating means for said motor means; control means movable between three different positions to respectively set said shutter mechanism for single-frame release, multiple-frame release and no-release; backwind means movable between operative and idle positions and adapted to move the film from said take-up means back to the source in said operative position thereof; and single manually actuated selector means comprising first cam means for controlling said actuating means and for selecting one of said three positions of said control means, second cam means for controlling said pull-down, and third cam means for controlling said backwind means, said second and third cam means being respectively arranged to maintain said pull-down in idle and operative positions when said backwind means is respectively maintained in the operative and idle positions thereof, said actuating means being arranged to arrest said motor means in the operative position of said backwind means.

4. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means, said actuating means cooperating with said shutter mechanism and being movable between three different positions to respectively set said shutter mechanism for single-frame release, multiple-frame release and no-release, said motor means being arrested in the no-release position of said shutter mechanism; backwind means movable between operative and idle positions and adapted to move the film from the take-up means to said source in the operative position thereof; and single manually actuated selector means comprising first cam means for controlling said actuating means, second cam means for controlling said pull-down, and third cam means for controlling said backwind means, said second and third cam means being respectively arranged to maintain said pull-down in operative and idle positions when said backwind means is respectively maintained in the idle and operative positions thereof and said first cam means being arranged to move said actuating means to a position corresponding to the no-release setting of said shutter mechanism when said third cam means maintains the backwind means in operative position.

5. A structure as set forth in claim 4, wherein said first cam means comprises a cam face for effecting a blocking of said actuating means in a position corresponding to the no-release setting of said shutter mechanism when said third cam means moves the backwind means to said operative position thereof.

6. A structure as set forth in claim 5, further comprising movable control means cooperating with said cam face and with said actuating means to block said actuating means in the operative position of said backwind means.

7. In a motion picture camera, in combination, a shutter mechanism; a source of film supply and film take-up means; a pull-down comprising lever means rockable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof; and single manually actuated selector means comprising first cam means for controlling said actuating means, second cam means for rocking said lever means, and third cam means for controlling said backwind means, said second and third cam means being respectively arranged to maintain said lever means in operative and idle positions when said backwind means is respectively maintained in the idle and operative positions thereof, said actuating means being arranged to arrest said motor means in the operative position of said backwind means.

8. In a motion picture camera, in combination, a shutter mechanism; a source of film supply and film take-up means; a pull-down comprising a lever rockable between operative and idle positions into and out of engagement with the film and resilient means for biasing said lever to one of such positions; motor means for driving said shutter mechanism and for operating said pull-down; actuating means for said motor means; backwind means movable between operative and idle positions and adapted to move the film from the take-up means to said source in the operative position thereof; and single manually actuated selector means comprising first cam means for controlling said actuating means, second cam means for moving said lever to the other position thereof, and third cam means for controlling said backwind means, said resilient means and said second and third cam means being respectively arranged to maintain said lever in operative and idle positions when said backwind means is respectively maintained in the idle and operative positions thereof, said actuating means being arranged to arrest said motor means in the operative position of said backwind means.

9. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof; and manually actuated selector means comprising a rotary cam shaft having an end portion, a first cam mounted on said shaft for controlling said actuating means, a second cam mounted on said end portion and having a cam face inclined with reference to the axis of said shaft for controlling said pull-down, and a third cam mounted on said shaft for controlling said backwind means, said second and third cams being respectively arranged to effect movement of said pull-down to the operative and idle positions thereof when said backwind means is respectively maintained in the idle and operative positions thereof, said actuating means being arranged to arrest said motor means in the operative position of said backwind means.

10. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof, said backwind means comprising a reciprocable strap; manually actuated selector means comprising a shaft, a first cam mounted on said shaft for controlling said actuating means, a second cam mounted on said shaft for controlling said pull-down, and a third cam comprising an eccentric mounted on said shaft and cooperating with said strap for controlling said backwind means, said second and third cams being respectively arranged to effect movement of said pull-down to said operative and idle positions thereof when said backwind means is respectively maintained in said idle and operative positions thereof, said actuating means being arranged to arrest said motor means in the operative position of said backwind means.

11. A structure as set forth in claim 10, wherein said source comprises a driven gear and wherein said backwind means further comprises a motion transmitting member rotatable about a fixed axis and having two substantially radial arms, coupling means connecting one of said arms to said strap so that said motion transmitting member is rocked in response to reciprocation of said strap, a slide coupled to the other of said arms and reciprocable in response to rocking of said motion transmitting member, a gear train including a first gear rotatable about said fixed axis and a second gear movable into and out of mesh with said driven gear in response to reciprocation of said slide, and manually actuatable means for rotating said first gear.

12. A structure as set forth in claim 11, wherein said coupling means comprises resilient means permitting intentional disengagement of said one arm from said strap.

13. A structure as set forth in claim 11, wherein said backwind means comprises a backwind shaft coaxial with and rigidly connected to said first gear and wherein said motion transmitting member is a sleeve which is rotatably mounted on said backwind shaft.

14. A structure as set forth in claim 11, further comprising guide means for said slide.

15. A structure as set forth in claim 14, further comprising adjustable stop means for arresting said slide when said second gear meshes with said driven gear.

16. A structure as set forth in claim 15, wherein said camera further comprises a housing having a portion supporting said guide means and said stop means and wherein said stop means includes an eccentric rotatably mounted on said portion of the housing.

17. In a motion picture camera, in combination, a shutter mechanism; a source of film supply and film take-up means; a pull-down movable between operative and idle positions into and out of engagement with the film; motor means for driving said shutter mechanism and for operating said pull-down; actuating means for said motor means; backwind means movable between operative and idle positions and adapted to move the film from the take-up means to said source in the operative position thereof; film frame counter means comprising a rotary scale and means for driving said scale in response to movement of the film between said take-up means and said source; and single manually actuated selector means comprising first cam means for controlling said actuating means, second cam means for controlling said pull-down, and third cam means for controlling said backwind means, said second and third cams being respectively arranged to maintain said pull-down in operative and idle positions when said backwind means is respectively maintained in the idle and operative positions thereof, said actuating means being arranged to arrest said motor means in the operative position of said backwind means.

18. A structure as set forth in claim 17, wherein said backwind means comprises a backwind shaft rotatable about a fixed axis to thereby effect transfer of film from said take-up means to said source in the operative position of said backwind means, said scale being mounted coaxially with said backwind shaft.

19. In a motion picture camera, in combination, a rotary shutter mechanism; control means arranged to set up said shutter mechanism for single-frame release, multiple-frame release and no-release; film supply means and film take-up means; a pull-down movable between operative and idle positions and arranged to transport the film from said supply means to said take-up means in the operative position thereof; motor means for rotating said shutter mechanism and for operating said pull-down; a backwind mechanism movable between operative and idle positions and adapted to transport the film from said take-up means to said supply means in said operative position thereof; and selector means including a manually actuated member, first cam means movable by said member between three different positions to select one of said settings for the shutter mechanism through the intermediary of said control means and to keep said motor means from running in response to setting of said shutter mechanism for no-release, second cam means movable by said member to respectively locate said pull-down in operative and idle positions in response to setting of said shutter mechanism for single-frame and multiple-frame release on the one hand and no-release on the other hand, and third cam means movable by said member to respectively locate said backwind mechanism in operative and idle positions when said pull-down is respectively located in idle and operative positions.

20. In a motion picture camera, in combination, a rotary shutter mechanism; control means arranged to set up said shutter mechanism for single-frame release, multiple-frame release and no-release; film supply means and film take-up means; a pull-down movable between operative and idle positions and arranged to transport the film from said supply means to said take-up means in the operative position thereof; motor means for rotating said shutter mechanism and for operating said pull-down; actuating means for said motor means, said actuating means cooperating with said control means to determine the setting of said shutter mechanism; at least one trigger means for operating said actuating means; a backwind mechanism movable between operative and idle positions and adapted to transport the film from said take-up means to said supply means in said operative position thereof; and selector means including a manually actuated member, first cam means movable by said member between three different positions to select one of said settings for the shutter mechanism through the intermediary of said control means and said actuating means and to keep said motor means from running in response to setting of said shutter mechanism for no-release, second cam means movable by said member to respectively locate said pull-down in operative and idle positions in response to setting of said shutter mechanism for single-frame and multiple-frame release on the one hand and no-release on the other hand, and third cam means movable by said member to respectively locate said backwind mechanism in operative and idle positions when said pull-down is respectively located in idle and operative positions.

21. In a motion picture camera, in combination, a rotary shutter mechanism; control means arranged to set up said shutter mechanism for single-frame release, multiple-frame release and no-release; film supply means and film take-up means; a pull-down movable between operative and idle positions and arranged to transport the film from said supply means to said take-up means in the operative position thereof; motor means for rotating said shutter mechanism and for operating said pull-down; a backwind mechanism movable between operative and idle positions and adapted to transport the film from said take-up means to said supply means in said operative position thereof; selector means including a manually actuated member, first cam means movable by said member between three different positions to select one of said settings for the shutter mechanism through the intermediary of said control means and to keep said motor means from running in response to setting of said shutter mechanism for no-release, second cam means movable by said member to respectively locate said pull-down in operative and idle positions in response to setting of said shutter mechanism for single-frame and multiple-frame release on the one hand and no-release on the other hand, and third cam means movable by said member to respectively locate said backwind mechanism in operative and idle positions when said pull-down is respectively located in idle and operative positions; and at least one manually actuatable means for operating said backwind mechanism independently of said selector means.

22. In a motion picture camera, in combination, film supply means and film take-up means; a pull-down movable between operative and idle positions and adapted to transport the film from said supply means to said take-up means in the operative position thereof; drive means for driving said pull-down in the operative position thereof; a backwind mechanism movable between operative and idle positions and adapted to transport the film from said take-up means to said supply means in the operative position thereof independently of said drive means; and selector means comprising a pair of portions manipulable by hand and respectively arranged to move said pull-down to operative and idle positions and to simultaneously move said backwind mechanism to the idle and operative positions thereof, said selector means further comprising an additional portion for controlling another function of the camera.

23. In a motion picture camera, in combination, film supply means and film take-up means; a pull-down movable between operative and idle positions and adapted to transport the film from said supply means to said take-up means in the operative position thereof; drive means for driving said pull-down in the operative position thereof; a backwind mechanism movable between operative and idle positions and adapted to transport the film from said take-up means to said supply means in the operative position thereof; selector means comprising a pair of portions manipulable by hand and respectively arranged to move said pull-down to operative and idle positions and to simultaneously move said backwind mechanism to the idle and operative positions thereof, said selector means further comprising an additional portion for controlling another function of the camera; and manually actuated means for operating said backwind mechanism independently of said selector means and said drive means.

References Cited

UNITED STATES PATENTS

| | | | |
|---|---|---|---|
| 2,539,521 | 1/1951 | Owens | 352—123 |
| 3,094,033 | 6/1963 | Thiele et al. | 352—169 |
| 3,181,174 | 4/1965 | Griffioen et al. | 352—180 |
| 3,240,550 | 3/1966 | Mitchell et al. | 352—124 |

JULIA E. COINER, *Primary Examiner.*